US011922252B1

United States Patent
Hadmack et al.

(10) Patent No.: US 11,922,252 B1
(45) Date of Patent: Mar. 5, 2024

(54) METAMATERIALS TECHNOLOGY FOR ORE TRACKING

(71) Applicant: Oceanit Laboratories, Inc., Honolulu, HI (US)

(72) Inventors: Michael Hadmack, Honolulu, HI (US); Ryan Miyamoto, Honolulu, HI (US); Glen Nakafuji, Honolulu, HI (US); Vinod Veedu, Houston, TX (US); Donald Harbin, Mililani, HI (US); Manabu Kimura, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 148 days.

(21) Appl. No.: 17/149,675

(22) Filed: Jan. 14, 2021

Related U.S. Application Data

(60) Provisional application No. 62/961,198, filed on Jan. 14, 2020.

(51) Int. Cl.
*G06K 7/10* (2006.01)
*G06K 19/07* (2006.01)
*G06N 3/08* (2023.01)
*G06N 20/00* (2019.01)

(52) U.S. Cl.
CPC ..... *G06K 7/10366* (2013.01); *G06K 19/0723* (2013.01); *G06N 3/08* (2013.01); *G06N 20/00* (2019.01)

(58) Field of Classification Search
CPC .......... G06K 7/10366; G06K 19/0723; G06N 20/00; G06N 3/08
See application file for complete search history.

(56) References Cited

U.S. PATENT DOCUMENTS

| | | | |
|---|---|---|---|
| 6,799,117 B1* | 9/2004 | Proett | E21B 49/08 702/12 |
| 10,927,671 B1* | 2/2021 | Tonner | E21B 21/066 |
| 2004/0175294 A1* | 9/2004 | Ellison | G01N 22/00 422/68.1 |
| 2007/0039949 A1* | 2/2007 | Wilson | H05B 6/705 219/679 |
| 2007/0093996 A1* | 4/2007 | Cariveau | E21B 10/55 703/7 |
| 2009/0004758 A1* | 1/2009 | Park | G01N 33/54373 436/526 |

(Continued)

*Primary Examiner* — Omer S Khan
(74) *Attorney, Agent, or Firm* — Fresh IP PLC; Clifford D. Hyra; Aubrey Y. Chen

(57) ABSTRACT

The present invention is generally directed to systems, materials, and methods for ore tracking. In particular, the invention relates to metamaterial RFID tags that are chip-free and comprise RF metamaterials to produce unique spectral features when illuminated with microwave radiation. In one or more embodiments of the present invention, each of the metamaterial RFID tags includes one or more tag units that have a particular spectral response representing a one-bit code. As a result, each tag may comprise a specific code that is "assembled" from a plurality of tag units in a modular fashion. One or more embodiments of the present invention further includes a blast-tolerant package for one or more of the metamaterial RFID tags that enables such tags to survive blasting, crushing, and/or other forces inherent in mine operations.

20 Claims, 4 Drawing Sheets

(56) References Cited

U.S. PATENT DOCUMENTS

| | | | |
|---|---|---|---|
| 2009/0030858 A1* | 1/2009 | Hegeman | G06N 3/02 |
| | | | 166/264 |
| 2017/0356287 A1* | 12/2017 | Roddy | E21B 47/00 |
| 2020/0003919 A1* | 1/2020 | Hathi | G01V 1/108 |
| 2020/0193206 A1* | 6/2020 | Turkelson | G06T 5/009 |
| 2022/0011080 A1* | 1/2022 | Thompson | F42B 30/006 |
| 2022/0124294 A1* | 4/2022 | Verma | H04N 13/156 |

\* cited by examiner

METAMATERIALS TECHNOLOGY FOR ORE TRACKING

CROSS-REFERENCE TO RELATED APPLICATIONS

This application claims priority to U.S. Provisional Application No. 62/961,198 filed Jan. 14, 2020, which is hereby incorporated by reference in its entirety.

FIELD OF THE INVENTION

The application relates generally to systems, devices, and methods for in-line processing, identification, and diagnosis of materials. In particular, the application relates to in-line processing of raw materials, including, but not limited to, ore, using multi-mode sensing and artificial intelligence to identify and type such materials.

BACKGROUND

Industries utilizing and/or requiring sample assays and analyses of materials to optimize operations include the mining industry, the oil and gas industry, the materials synthesis industry, and others. Common to all of these industries is the general process of producing a material stream that needs to be periodically sampled and analyzed in a systematic way to ensure efficient operations, thereby controlling or reducing costs and optimizing performance.

As a non-limiting example, in the mining industry, it is desirable to periodically assay the spoils from mining operations to reconstruct the geologic composition (ore body) of the mine to indicate the ore depletion and remaining value. Efficient operations management for minerals processing and extraction involves precise control over the mining process and detailed scheduling of downstream processing of metallic ore. A reliable inventory control method enables appropriate planning and operations of a mine and its mineral extractions processes. As a result, accurate tracking of ore through the mine is necessary and valuable because it can greatly enhance ore processing efficiency.

A key source of variability in the production chain relates to the uncertainty of the properties of the mined ore and how that ore moves through the production line, resulting in process variability and waste. Existing methods of mitigating this variability utilizing ore body assays are slow and costly.

Other similar applications include mud-logging in the oil and gas industry, which may comprise mixed-phase (e.g., solid-liquid) materials streams. In such streams, solid fragments and particulates are distributed within a liquid, forming a dilute particulate mixture or liquid slurry. In these cases, identification and characterization of the solid materials requires separation of the solids from the liquid phase prior to observation.

Given the foregoing, there exists a significant need for systems, devices, and methods that enable the in-line identification, processing, and diagnosis of materials, including, but not limited to, raw materials, in real-time.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein.

In general, the present invention is directed towards systems, devices, and methods for in-line processing, identification, and diagnosis of materials, including, but not limited to, ore. In particular, the present invention is directed towards in-line, real-time processing, identification, and diagnosis of materials.

The ability to track ore from its source ore block within the ore body through the various steps of blasting, crushing, stockpiling, blending, and grinding allows quantitative blending of ore grades. This, in turn, allows for preparation of a uniform ore grade that enables optimal downstream processing. Furthermore, the ore blend can be refined by monitoring the effect of ore sources on mine performance and product quality. This significantly reduces process variability and waste that currently exists due to natural, but untracked, variability in ore characteristics, while at the same time reducing dependence on slow and costly ore body assays. Analogous principles apply to other applications.

In at least one embodiment of the invention, a method for processing materials comprises rapid sample preparation from a process stream; sample scanning, which may comprise sample interrogation using one or more energy sources, including, but not limited to, visible, infrared, radio-frequency (RF), ionizing radiation, chemical, electrical, and/or acoustic; analysis of scanned sample data, which may utilize multiple artificial intelligence (AI) methods including, but not limited to, machine learning, machine vision, and/or anthronoetic AI, and may further include implementing analysis methods on computer hardware and/or software; and providing the analyzed sample data to a user in real-time using, for instance, the user's mobile phone or an augmented reality device.

The invention in its various embodiments also comprises novel metamaterial radio frequency identification (RFID) tags that are chip-free and comprise RF metamaterials to produce unique spectral features when illuminated with microwave radiation.

In at least one embodiment of the present invention, each of the metamaterial RFID tags comprises one or more tag units that have a particular spectral response representing a one-bit code. As a result, each tag may comprise a specific code that is "assembled" from a plurality of tag units in a modular fashion.

One or more embodiments of the present invention further comprise a blast-tolerant package for one or more of the metamaterial RFID tags that enables such tags to survive blasting, crushing, and/or other forces inherent in mine operations.

The present invention in its various embodiments has several advantages over conventional RFID tags, including, as non-limiting examples, low cost (i.e., only a few USD per deployment), reliability under high-temperature conditions that exist, for example, in a mine and during mining processes, survivability in explosive and crushing processes such as those that occur in a mine, high probability of tag detection, capability to detect mixing, operability in both wet and dry conditions, fully automated detection, and a 1-2 week tag lifetime. Additionally, the unique tags disclosed herein comprise at least 500 uniquely identifiable tag codes, which increases the ability for users to deploy many different tags for ore tracking purposes.

In at least one embodiment of this disclosure, a metamaterial RFID tag is disclosed. This tag comprises one or more RFID tag units, each comprising one or more radio-frequency (RF) metamaterials that produces a unique spectral feature when illuminated with microwave radiation, wherein each of the one or more RFID tag units has a unique spectral response representing a one-bit code. The aforementioned RFID tag may, in some embodiments, lack any integrated circuit or chip.

Additionally, the one or more RFID tag units may be encased in a blast-tolerant package. This package, in some implementations, comprises hard epoxy encapsulating the one or more RFID tag units and one or more layers of polymer that increases shock tolerance.

The one or more metamaterials comprising the tag units may be selected from the group consisting of: metal films, three-dimensional bent and/or stamped metal structures, and three-dimensional printed structures.

In at least a further embodiment, each of the one or more RFID tag units has a code of "1" if its unique spectral response is present at a pre-determined spectral frequency, and a code of "0" if its unique spectral response is not present at the pre-determined spectral frequency. This pre-determined spectral frequency may be selected from the group consisting of: 3.3 GHz, 3.9 GHz, 4.5 GHz, 4.9 GHz, 5.3 GHz, and 5.8 GHz.

A method for the automated processing of materials is also described herein. This method comprises extracting a sample from a process stream comprising one or more materials; scanning the sample by interrogating the sample using one or more energy sources, thereby producing scanned sample data, wherein the one or more energy sources are selected from the group consisting of: visible light, infrared light, radio-frequency (RF) energy, ionizing radiation, chemical energy, electrical energy, acoustic energy, and combinations thereof; using one or more artificial intelligence (AI) methods to analyze the scanned sample data to identify and sort the one or more materials in the process stream, thereby producing analyzed sample data; and providing the analyzed sample data to a user.

The aforementioned step of providing the analyzed sample data to the user may further comprise sending the analyzed sample data in real-time to the user's computing device, wherein the computing device comprises a mobile phone.

In at least one embodiment, the method described herein additionally comprises executing an operational response regarding in-line processing of the one or more materials based on the analyzed sample data. This executing step may comprise applying one or more algorithms to optimize processing of the one or more materials.

The process stream referred to above herein may be either a stream of fragmented solids or a mixed phase solid-liquid stream. The aforementioned method may further comprise removing solids from the mixed phase solid-liquid stream.

In at least one embodiment, the one or more artificial intelligence (AI) methods are selected from the group consisting of: machine learning, machine vision, anthronoetic AI, and combinations thereof. Further, the one or more AI methods may be implemented on hardware and/or software of a computing device, and the one or more AI methods may additionally comprise Mask R-CNN.

The sample extracted from the process stream may, in some embodiments, comprises one or more tags, each of the one or more tags being uniquely differentiable from each other. These one or more tags may be utilized to track at least one of the one or more materials through one or more steps of the process stream. It should be appreciated that the one or more tags could be RFID tags and/or non-RFID tags. Non-limiting examples of non-RFID tags include, for instance, dyes, coatings (especially, e.g., coatings exhibiting an optical property), devices (including electronic devices), and the like.

A method of utilizing one or more RFID tag units is also described herein. Such method comprises dispersing one or more RFID tag units in a process stream, wherein each of the one or more RFID tag units comprises one or more RF metamaterials that produces a unique spectral feature when illuminated with microwave radiation, and wherein each of the one or more RFID tag units has a unique spectral response representing a one-bit code; detecting at least one of the one or more RFID tag units via the unique spectral response; and analyzing one or more materials in the process stream associated with the at least one of the one or more RFID tag units.

In some embodiments, the analyzing step referred to above further comprises determining a time when the one or more types of ore was extracted; and determining a location in a mine from which the one or more types of ore was extracted.

In additional embodiments, the process stream is an ore stream, and the one or more materials comprises one or more types of ore.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein.

DETAILED DESCRIPTION

Figure 1:
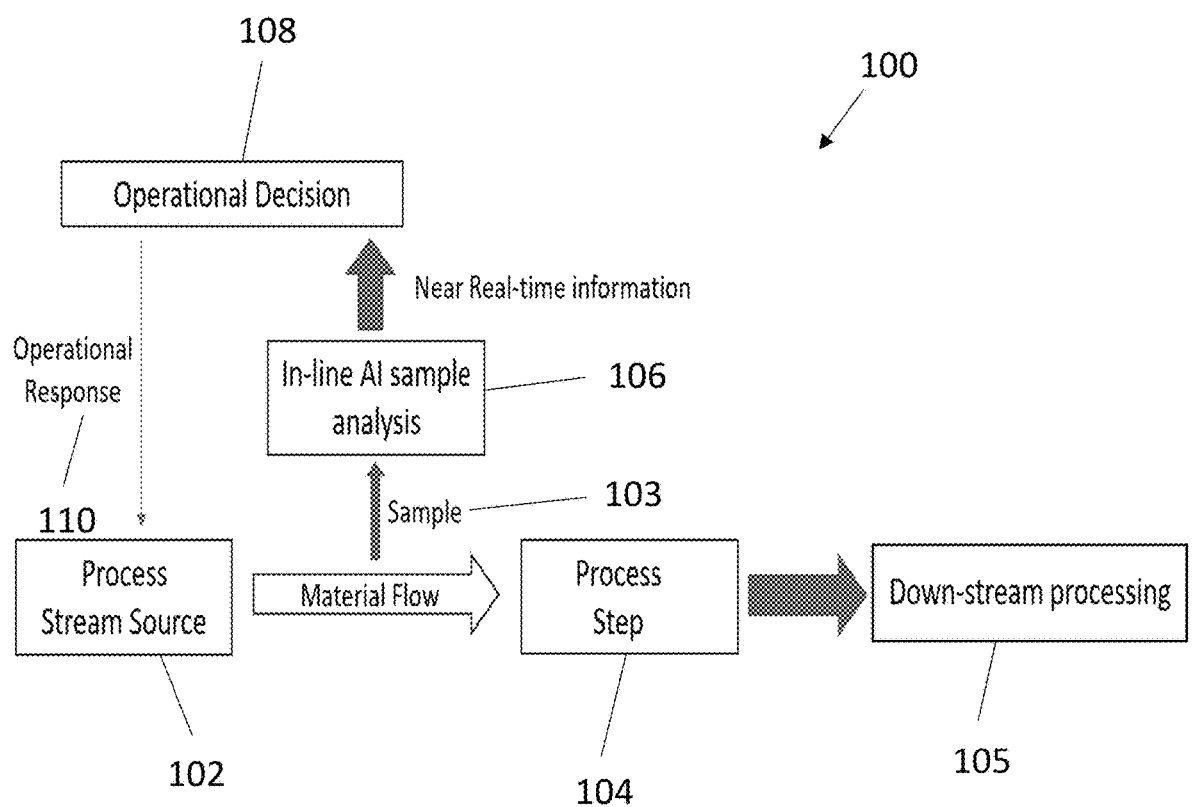
FIG. 1 is a flow diagram depicting the general process for in-line processing and identification of materials, according to an embodiment of the present invention.

The present invention will now be disclosed in terms of various exemplary embodiments. This specification discloses one or more embodiments that incorporate features of the invention. The embodiment(s) described, and references in the specification to "one embodiment," "an embodiment," "an example embodiment," etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, "at least one of A, B, and C" indicates A or B or C or any combination thereof. As used herein, the singular form of a word includes the plural, and vice versa, unless the context clearly dictates otherwise. Thus, the references "a," "an," and "the" are generally inclusive of the plurals of the respective terms. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

As used herein, ranges are used in shorthand, so as to avoid having to list and describe each and every value within the range. Any appropriate value within the range can be selected, where appropriate, as the upper value, lower value, or the terminus of the range.

The words "comprise," "comprises," and "comprising" are to be interpreted inclusively rather than exclusively. Likewise, the terms "include," "including," and "or" should all be construed to be inclusive, unless such a construction is clearly prohibited from the context. The terms "comprising" or "including" are intended to include embodiments encompassed by the terms "consisting essentially of" and "consisting of." Similarly, the term "consisting essentially of" is intended to include embodiments encompassed by the term "consisting of." Although having distinct meanings, the terms "comprising," "having," "containing," and "consisting of" may be replaced with one another throughout the description of the invention.

"About" means a referenced numeric indication plus or minus 10% of that referenced numeric indication. For example, the term "about 4" would include a range of 3.6 to 4.4. All numbers expressing quantities of ingredients, reaction conditions, and so forth used in the specification are to be understood as being modified in all instances by the term "about." Accordingly, unless indicated to the contrary, the numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

Wherever the phrases "for example," "such as," "including" and the like are used herein, the phrase "and without limitation" is understood to follow unless explicitly stated otherwise.

The terms "typically" or "optionally" mean that the subsequently described event or circumstance may or may not occur, and that the description includes instances where said event or circumstance occurs and instances where it does not.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Generally, embodiments of the present invention are directed towards systems, devices, and methods for in-line processing, identification, and diagnosis of materials, including, but not limited to, ore. In particular, some embodiments of the present invention are directed towards in-line, real-time processing, identification, and diagnosis of materials.

In at least one embodiment of the invention, a method for processing materials comprises rapid sample preparation from a process stream; sample scanning, which may comprise sample interrogation using one or more energy sources, including, but not limited to, visible, infrared, radio-frequency (RF), ionizing radiation, chemical, electrical, and/or acoustic; analysis of scanned sample data, which may utilize multiple artificial intelligence (AI) methods including, but not limited to, machine learning, machine vision, and/or anthronoetic AI, and may further include implementing analysis methods on computer hardware and/or software;

and providing the analyzed sample data to a user in real-time using, for instance, the user's mobile phone or an augmented reality device, and/or another computing device.

Turning now to FIG. 1, a flow diagram is shown of a method 100 for processing materials according to an embodiment of the present invention. It should be appreciated that the method automates various processes in order to determine material contents of a process stream. Materials flow from a process stream source 102 to a process step 104, after which the materials are processed downstream 105. The process stream source 102 may be, as a non-limiting example, a stream of fragmented solids (such as, for instance, solids that occur in ore mining) or a mixed phase solid-liquid stream (such as occurs, for instance, in oil and gas mud logging). In the case of a mixed phase stream, it may be desirable to separate the solids from the liquid so as to better identify and diagnose the materials that comprise the solids.

As the materials flow from process stream source 102 to the process step 104, a sample 103 of the materials is extracted for in-line sample analysis at step 106. As stated above herein, such sample analysis may include, for instance, utilization of one or more AI methods or algorithms. Accordingly, the sample analysis step 106 may utilize known machine learning, anthronoetic, and/or other AI algorithms used to intelligently identify and sort the material streams. It will be appreciated that the resulting information can be collated, stored, and conveyed 107 to a user in real-time or near-real-time.

Specific, non-limiting AI methods that use convolutional neural nets include "instance segmentation" in the field of computer vision. A type of implementation called "Mask R-CNN" may be used. Mask R-CNN is a technique that identifies not only the types of individual rocks, but also their shapes, thereby enabling the measurement of various attributes such as size, roundness, etc. It should be appreciated that, since this is based on a conventional neural network, accurate identification of rocks occurs regardless of lighting, angle of processing, and other environmental variations, including, but not limited to, magnification issues.

Information from the sample analysis step 106 is then used at step 108 to reach an operational decision regarding the in-line processing of the materials, which may then lead to an operational response 110 that affects the process stream source. Operational responses include, for example, reconstructing an ore body to optimize extraction operations and/or to drill more efficiently for materials (e.g., minerals, hydrocarbons, etc.). Specifically, the present invention in its various embodiments allows for mine operators to relate the quality and efficiency of mill output to the origin of source material within the mine. As a non-limiting example, tracking the flow of source material through a mine and mill allows mine operators to apply algorithms to optimize the selection of materials and prioritize regions of the mine for extraction. Thus, a particular mill process may be optimized to produce, as an illustrative example, 80% copper and 10% zinc, and by mixing ore from different parts of the mine peak mill efficiency can be maintained.

At least another embodiment of the present invention comprises novel metamaterial radio frequency identification (RFID) tags that are chip-free and comprise RF metamaterials to produce unique spectral features when illuminated with microwave radiation.

In one or more embodiments of the present invention, each of the metamaterial RFID tags comprises one or more tag units that have a particular spectral response representing a one-bit code. As a result, each tag may comprise a specific code that is "assembled" from a plurality of tag units in a modular fashion.

It should be appreciated that the present invention in one or more embodiments is especially useful for applications where low cost and high redundancy of tags are prioritized over code uniqueness. Conventional passive and active RFID technologies use a small microchip to transmit virtually unique identification codes; however, a small integrated circuit must be bonded to the antenna structures, increasing manufacturing cost and fragility.

By contrast, the present invention in its various embodiments is a chip-free RFID tag that relies on RF metamaterials to produce unique spectral features when illuminated with microwave radiation. One of skill in the art will appreciate that this chip-free RFID tag technology (also referred to herein as "MetaTrace") comprises resonant RF structures that are easily replicated at low cost in metal films, and can easily be encapsulated in a blast-tolerant polymer package for ore tracking applications. The size of any individual tag is dependent on the wavelength of RF used. Non-limiting examples of resonant RF structures include metal films deposited or etched on to a dielectric substrate, 3D structures made from bent and/or stamped metal, and 3D printed structures. Each individual tag may be encapsulated in hard epoxy and then overmolded with layers of polymer designed to increase shock tolerance. One or more additional layers of soft material may also be included in between the layers of polymer and/or the hard epoxy. Such an encapsulated tag may have a shape and size similar to a hockey puck.

Each metamaterial RFID tag unit (also referred to herein as "OreBit" or, in the plural, "OreBits") has a particular spectral response that represents a one-bit code. Codes of greater complexity can therefore be "assembled' by combining different modular OreBits.

It will be apparent to a skilled artisan that these more complex codes can be utilized in at least two different operating modes, such as, for instance, (1) dispersing many different tags in an ore stream and detecting them individually, with the compound code represented by a time average of OreBits passing an interrogation receiver on a conveyor belt, and (2) physically bonding several OreBits together to form one or more compound tags, each with a unique code that is instantly recognizable upon passing an interrogation receiver. Multiple OreBits can be bonded together using, for instance, known adhesive materials, interlocking surfaces, and/or interlocking ends. Such bonded OreBits may then be encapsulated for blast tolerance as described above.

Figure 2:
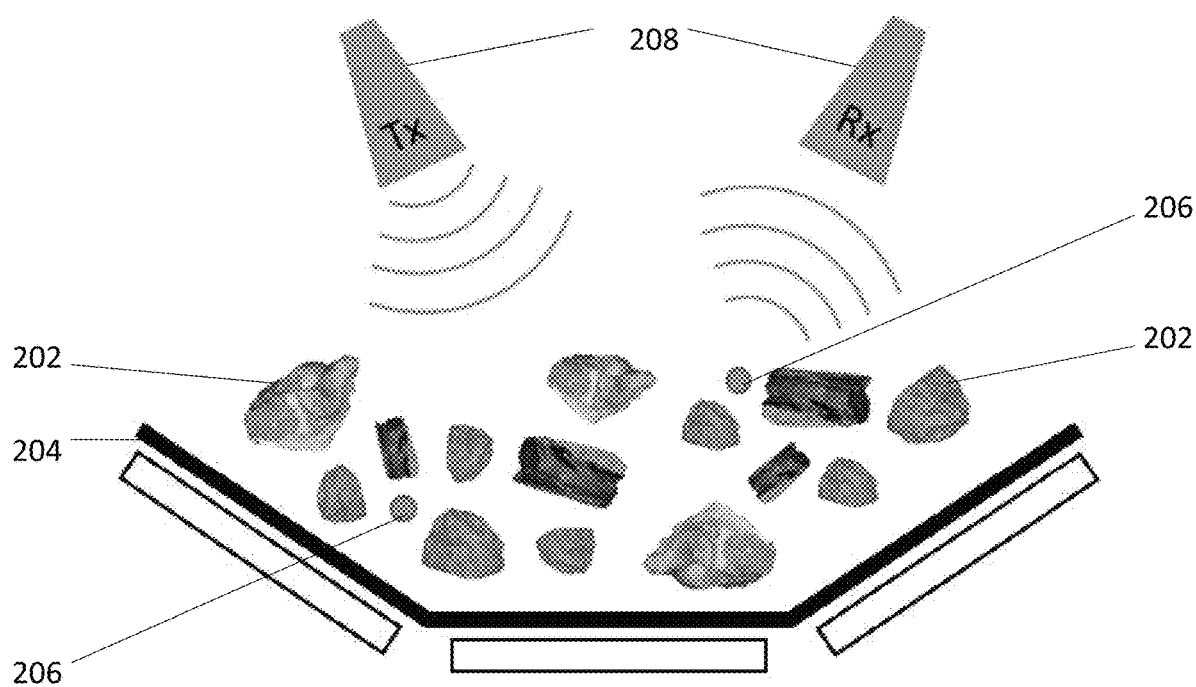
FIG. 2 is a depiction of the detection and interrogation of metamaterial RFID tags dispersed in ore on a conveyor belt, according to at least one embodiment of the present invention.

FIG. 2 illustrates a non-limiting example of OreBit usage in the mining context. Mined ore 202 is placed on a conveyor belt 204, and one or more metamaterial RFID tags 206 are already dispersed in the mined ore 202. As the ore travels along the conveyor belt, the one or more RFID tags 206 are interrogated by microwave radiation sources 208. Detection of the one or more tags 206 is therefore achieved, allowing users to identify the specific composition of the mined ore 202 based on the tags detected. Typically, certain tags are associated with ore from certain locations in the orebody, the composition of which may be known based on samples/assays, or other data.

In some embodiments, OreBits are bonded together as described above to create a compound tag having a unique code, and many identical such compound tags may be distributed in a given load of ore to achieve acceptable detection and survivability rates. By way of example, in an embodiment using compound tags, a number of compound tags with the unique code 1001 may be created by physically bonding together tag components representing bits 1000 and 0001, and a number of these compound tags may be distributed within a given area of an orebody.

In other embodiments, various one-bit tags may be dispersed in the materials in certain ratios, rather than being bonded together to create compound tags. In such embodiments, the unique code results from an aggregation of data from the tags as a group, rather than from any individual tag. In such an embodiment, in an example analogous to the compound tag example provided above, equal numbers of one-bit tags representing bits 1000 and 0001 are distributed within the given area of the orebody. When queried, the system detects mostly 1000 and 0001 responses within the batch and thus characterizes that batch as having the unique code 1001 (other tags components such as 0100 might also be detected due to mixing with ore from another location in the orebody or stray tags, but in lower amounts). The more tags that are used, the better the contrast and discrimination. In such an embodiment, it may be especially important to use a coding scheme that minimizes ambiguity. For instance, using codes 1010 and 1110 in proximity could lead to ambiguity as most of the bits are shared between the codes and a small amount of mixing could lead to substantial uncertainty as to the correct code. In contrast, 0101 and 1010 would give much higher contrast.

Coding schemes are used to minimize ambiguity. As a non-limiting example, using codes "1010" and "1110" in proximity would result in higher ambiguity, but using "1010" and "0101" would provide less ambiguity and higher contrast.

It should be appreciated that since unique identification codes are "assembled" from inexpensive OreBits in the field, the modular metamaterial RFID tags can be replicated on a large scale at low cost. Instead of having to prepare many unique RFID tags, a few different orebits can be inexpensively mass-produced and combined as needed to generate as many unique codes as are needed. Therefore, large quantities of such MetaTrace tags can be deployed in situations, environments, and applications where a single conventional RFID tag would normally be used due to cost.

It should further be appreciated that, in ore tracking applications, there is a high probability of non-detection of conventional RFID tags via destruction or obscuration of the tags. The present invention in its various embodiments therefore enables an enhanced probability of detection by deploying large quantities of MetaTrace tags. For example, where an RFID tag is needed, five or ten identical RFID tags may be deployed so that if one or several are damages or destroyed or otherwise undetectable, detection is nevertheless highly likely.

Figure 3:
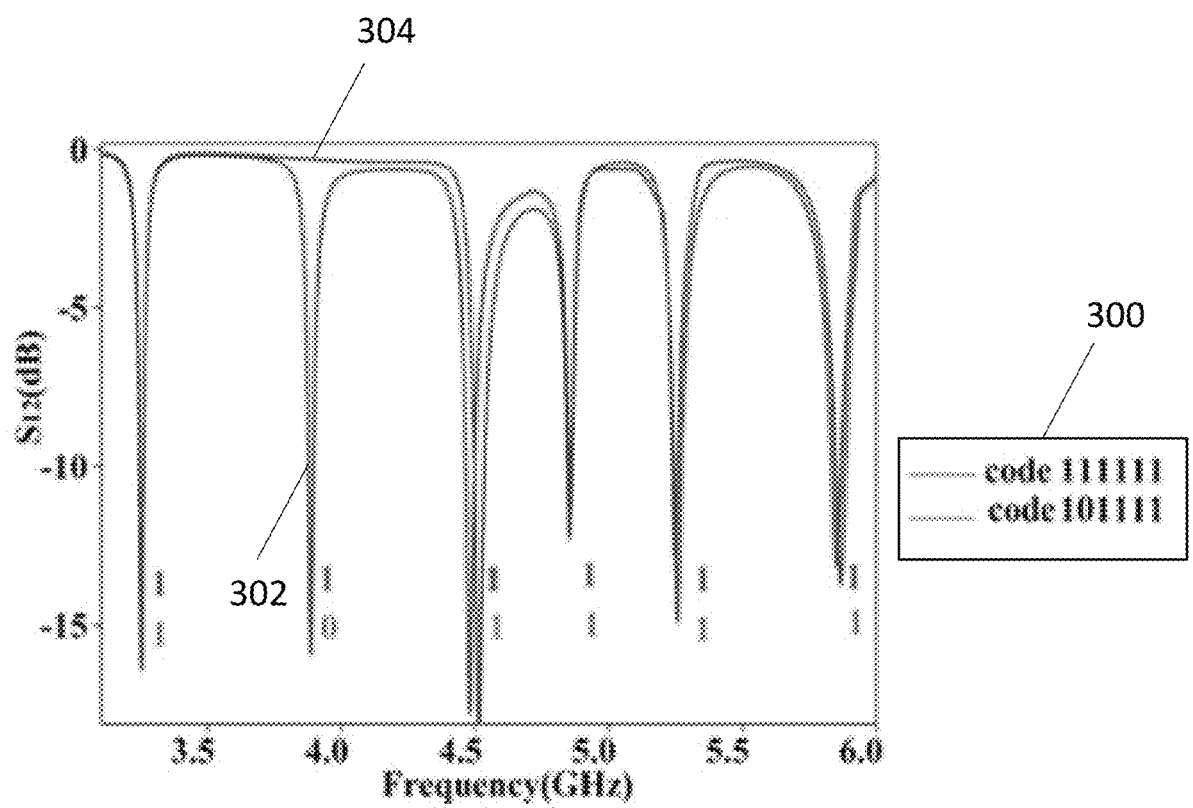
FIG. 3 illustrates a non-limiting example of spectral encoding in two metamaterial RFID tags, according to at least one embodiment of the present invention.

Turning now to FIG. 3, a non-limiting example of spectral coding in a metamaterial RFID tag is shown. As can be seen, each of the codes 300 comprises a plurality of modular tag units/OreBits. For example, the tag with the code "111111," which corresponds to spectral feature 302, comprises six individual OreBits, each with a one-bit code of "1." Similarly, the tag with the code "101111," which corresponds to spectral feature 304, comprises six individual OreBits, five with a one-bit code of "1" and one with a one-bit code of "0." Each OreBit has a code of "1" if it is present at a particular frequency, and a code of "0" if it is not present at that particular frequency. In this example, each OreBit exhibits a spectral feature in only one frequency, so that one OreBit is needed for each "1" in the code. In other embodiments, an OreBit might exhibit a spectral feature in more than one frequency such that fewer OreBits would be required for a code of any given length. When setting up the system, frequencies which correspond to bits are selected. For example, in the illustrated embodiment bits are selected at about 3.3 GHz, 3.9 GHz, 4.5 GHz, 4.9 GHz, 5.3 GHz, and 5.8 GHz. The gap between frequencies should at least be sufficient to accommodate the ability of a selected receiver(s) to discriminate between frequencies, as well as the width of the spectral features, to avoid misidentification. Which frequency corresponds to which digit in the code is also selected, in this case the digits from first to last go from the lowest frequency to the highest frequency. When interrogated by microwave energy at each of these frequencies, a response that is attenuated by at least a threshold value, for example 5 dB, is considered a one, while a response that is attenuated less than the threshold is considered a zero. Such an attenuated response is one example of a spectral feature at that frequency.

One of skill in the art will appreciate that the number of unique OreBit codes is ultimately limited by the transmitter bandwidth and receiver frequency discrimination. Purely as a non-limiting example, a system operating in the 2.4 GHz±125 MHz ISM band, with 10 MHz wide tag spectral features, could encode 10 bits of data, or 2048 unique MetaTrace codes (or 1024 codes with error correction).

Figure 4:
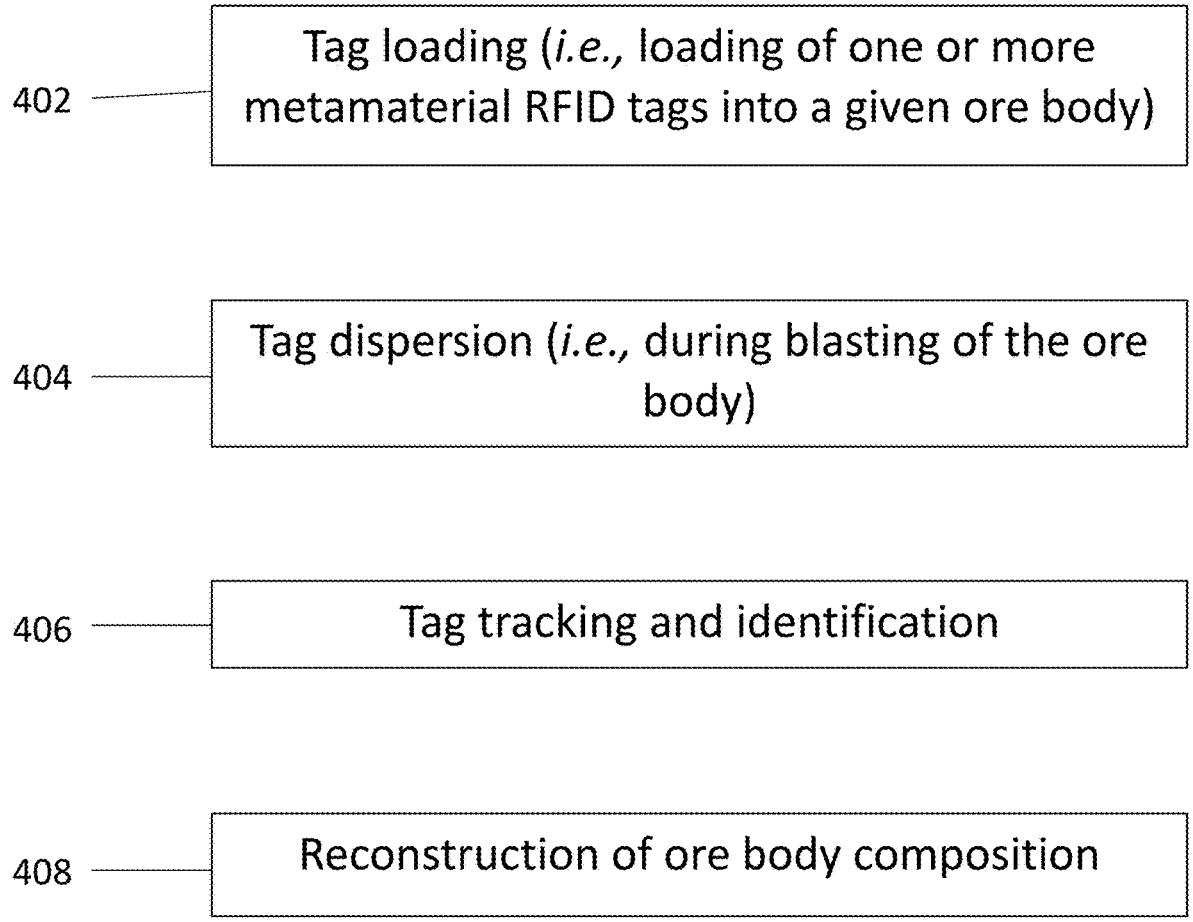
FIG. 4 is a process diagram illustrating the use of metamaterial RFID tags within the logistical steps of the mining process, according to at least one embodiment of the present invention.

The use of a finite code set is particularly suitable for ore tracking applications due to the linear process flow of mine logistics, shown via process diagram in FIG. 4. At the first step 402, one or more metamaterial RFID tags according to one or more embodiments of the present invention are distributed into a given ore body. For example, metamaterial RFID tags may be distributed into blast holes prior to blasting. When the rock around the blast holes is fractured into rubble by explosives, the tags stay largely in the local area. When the ore is excavated as rubble, the tags from each blast site end up with the ore, typically in a dump truck full of rock. The tags then follow the lot of ore through processing until they are damaged by crushers or grinders.

In a simple implementation, each blast hole may receive RFID tags having the same code, and the RFID tags in each blast hole may have a different code than the RFID tags in each other blast hole. The type of ore present in the area of each blast hole may already be known from assays or other testing/observation, so the RFID code assigned to a given blast hole may correspond to a known ore type as the RFID codes are tracked through the system. Alternatively, after blasting some assay or other test and/or observation may be performed, preferably prior to mixing with the contents of other ore bodies/blast holes, to characterize the ore associated with a given RFID code.

During the mining process, when ore is extracted, the RFID tags are dispersed at step 404 along with the ore they are distributed in. As stated above herein, it is particularly important that the tags be able to survive blasting, crushing, and other forces and processes that result when ore is extracted. Subsequently, when mined ore is passed through various mine processes, the metamaterial RFID tags can be detected at step 406. A non-limiting example of such detection is provided above herein with reference to FIG. 2. That is, tag detection can be achieved while ore is being passed along a conveyor belt. Once the tags are detected, a user can reconstruct the composition of the ore body that the one or more tags came from, at step 408.

Since mining processes are relatively linear, codes can be selected in a systematic order and attached to both temporal and spatial information about the origin of the ore being tracked (i.e. the location where the ore originated and the time when the ore was extracted). Additionally, code errors are detectable and often correctable when codes are selected in such a systematic order, increasing fidelity of the entire tracking system. For example, if a bit is erroneously missing, which causes the code to indicate the ore was extracted far in the past, it may be apparent that this is an error and it may be possible to determine which bit is most likely erroneously missing so the error can be corrected.

In further embodiments of the present invention, a system and method for code assignments is provided that minimizes the probability of ambiguity between adjacent ore blocks in the ore body. This is achieved by maximizing code orthogonality for spatially- and temporally-related ore blocks. For example, in an extreme case, a first ore block might have the code 111111 while a second ore block next to it has the code 000000. Thus, if one bit is erroneously altered such that ore from the first ore block returns the code 111110, it will be apparent that there is an error, and that this ore is not from the second ore block. In contrast if the first ore block has a code of 000001, an error on the last bit would make the ore seem to be from the second ore block, a very difficult error to detect since the two ore blocks are directly adjacent and it would be difficult to determine whether ore is from the first or second ore block without RFID tracking. Orebodies are three-dimensional, but ore is typically removed from an orebody in an ordered sequence (which may be predicted or entered into the system by an operator), therefore the system can anticipate the relative timing of ore removal from various locations in the orebody and use that information to guide the assignment and error correction of codes.

Codes are assigned by a computer algorithm and the corresponding metamaterial RFID tags may be dispensed by machine for deployment at the desired ore block. The tags may be interrogated using the code point of origin information, in combination with statistical analyses, and optionally mine and mill process data, to enhance confidence in code readings. As the ore proceeds through stockpiling and milling, code fidelity is expected to degrade as RFID tags are damaged and/or buried under large amounts of material, reducing contrast and decreasing error correction capability; however, historical data for each code may be available, as well as statistical tools for estimating the probability of accurate tag detection at downstream interrogation stations. For example, if a given code is detected moving downstream through the mining process and then suddenly that code is no longer detected and a new code differing by one bit is detected instead, the system may determine that the code has degraded but in fact this newly detected code represents the same ore as the previously detected code. When a code is reused, the system may store where and when the reuse occurs, and estimate the probability that the reused code will mix with the original use of the code based on where and when the code has been used and the historical flow of ore through the system, and reuse codes where and when the chances of mixing are lowest.

One of skill in the art will appreciate that the MetaTrace tags have both a small size (in many embodiments, <1 cm) and a low cost, due to the fact that they may be fabricated by standard sheet metal, electronics fabrication, and 3D printing methods, rendering them both practical and economical to insert at each blast site. Indeed, redundant tags can be inserted to increase the probability of tag detection throughout the various mining processes. At step 402, the tags may be inserted into, for example, the blast stemming to improve tag survival and ensure inclusion in the blasted ore block when that block is excavated. Proximity of the tags to the blast will partly determine the level of tag dispersion within the muck pile, at step 404. The size of the tag will be driven partly by the degree of blast hardening required, based on the forces experienced in the planned blasting and the tolerable tag attrition rate that results in a sufficient number of tags surviving to get a signal of the desired fidelity.

Although the high frequency of the excitation radiation used to query the RFID tags limits the degree of penetration into the crushed ore stream, each metamaterial RFID tag's small size and low cost allows redundancy of tags, thereby increasing detection probability at step 406. Furthermore, the transmitting antenna can be highly directional and operate in a scanning mode to provide ample microwave power to a small region of interest on a conveyor belt. Scanning can increase probability of detection by varying the polarization and direction of the source radiation to match the tag position and orientation.

One of skill in the art will further appreciate that the metamaterial RFID tags are capable of being detected in a variety of environments that occur in and around a mine, including within gravel of various particle size distributions and compositions, within water and various other liquids, within various soils and mud, and the like.

It should further be appreciated that multiple bands, besides the 2.4 GHz band disclosed above herein, may be used. Non-limiting examples of these bands include a 5.8 GHz band and a 24 GHz band. The latter may enable smaller tag size, improved survivability, and lower cost. Additionally, the sensitivity of the receiver may be tuned for a given transmitted pulse energy in a given RF band. The number of tags per cubic meter may also be tailored to optimize positive identification for a baseline RF system and in a variety of environments/tag distributions.

Ruggedness of the metamaterial RFID tags may be optimized to ensure identification code fidelity and detectability under a range of blast conditions and their resulting deformation potentials. Various embodiments of the present invention may trade-off the competing demands of device detectability, device survival, and cost. Purely as a non-limiting example, certain metamaterial RFID tags may be tailored for detectability at low power and at long range. Such tags may be further encapsulated in blast-tolerant packaging for impact and crush resistance.

One or more system embodiments of the present invention may comprise hundreds to thousands of metamaterial RFID tags. These may be manufactured in volume for scale cost reduction. The one or more system embodiments may further comprise at least one interrogation system installed in one or more locations at mine and/or mill sites, including, but not limited to, on ore conveyor belts.

These new systems may use RF communication for querying RFID tags, advanced imaging modalities for determining material type, and/or sophisticated data processing for determining identification codes, detecting errors, and correcting errors. In at least one system embodiment, the system allows for increased mine and/or mill productivity through process improvements obtained by intelligence gathered through the system. Such process improvements include, for example, changing the rate at which ore is fed into machines, changing the amount of chemicals used in operations, changing the duration of chemical soaking steps, and the like. The system enables accurate and advanced tracking of minerals and/or ore throughout all stages of the mining and/or milling process, which thereby allows quantitative blending of ore grades to optimize downstream productivity according to well-known formulas.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

We claim:

1. A method for automated processing of materials, the method comprising:
   extracting a sample from a process stream, the process stream being a stream of one or more materials moving from a source of origin to a downstream processing of the one or more materials;
   scanning the sample by interrogating the sample using one or more energy sources, thereby producing scanned sample data, wherein the one or more energy sources are selected from the group consisting of: visible light, infrared light, radio-frequency (RF) energy, ionizing radiation, chemical energy, electrical energy, acoustic energy, and combinations thereof;
   using one or more artificial intelligence (AI) methods to analyze the scanned sample data to identify and sort the one or more materials in the process stream, thereby producing analyzed sample data; and
   providing the analyzed sample data to a user;
   wherein the sample comprises one or more RFID tags, wherein each of the one or more RFID tags comprises one or more radio-frequency (RF) metamaterials that produces a unique spectral feature when illuminated with microwave radiation, wherein each of the one or more RFID tags has a unique spectral response representing a one-bit code, wherein each of the one or more RFID tags has a code of "1" if the unique spectral response is present at a pre-determined spectral frequency, and a code of "0" if the unique spectral response is not present at the pre-determined spectral frequency;
   wherein the one or more RFID tags are chip-free and encapsulated in a package comprising hard epoxy and one or more polymer layers.

2. The method of claim 1, wherein the process stream is either a stream of fragmented solids or a mixed phase solid-liquid stream.

3. The method of claim 2, further comprising:
   removing solids from the mixed phase solid-liquid stream.

4. The method of claim 1, wherein the one or more artificial intelligence (AI) methods are selected from the group consisting of: machine learning, machine vision, anthronoetic AI, and combinations thereof.

5. The method of claim 4, wherein the one or more AI methods are implemented on hardware and/or software of a computing device.

6. The method of claim 4, wherein the one or more AI methods comprise a Mask region-based convolutional neural network (Mask R-CNN).

7. The method of claim 1, wherein the providing step further comprises:
   sending the analyzed sample data in real-time to the user's computing device, wherein the computing device comprises a mobile phone.

8. The method of claim 1, further comprising:
   executing an operational response regarding in-line processing of the one or more materials based on the analyzed sample data.

9. The method of claim 8, wherein the executing step further comprises:
   applying one or more algorithms to optimize processing of the one or more materials.

10. The method of claim 1, further comprising:
    utilizing the one or more RFID tags to track at least one of the one or more materials through one or more steps of the process stream.

11. The method of claim 1, wherein the process stream is an ore stream, and wherein the one or more materials comprises one or more types of ore.

12. The method of claim 11, wherein the analyzing step further comprises:
    determining a time when the one or more types of ore was extracted; and
    determining a location in a mine from which the one or more types of ore was extracted.

13. The method of claim 8, wherein the operational response affects the source.

14. The method of claim 13, wherein the operational response comprises prioritizing one or more regions of the source for extraction.

15. The method of claim 1, wherein the one or more RFID tags are dispersed within one or more types of ore in the process stream.

16. The method of claim 1, wherein polarization and direction of at least one of the one or more energy sources is varied to match position and orientation of at least one of the one or more RFID tags.

17. The method of claim 1, wherein the package is a blast-tolerant package.

18. The method of claim 17, wherein the one or more polymer layers increases shock tolerance.

19. The method of claim 1, wherein the one or more RF metamaterials is selected from the group consisting of: metal films, three-dimensional bent or stamped metal structures, and three-dimensional printed structures.

20. The method of claim 1, wherein the pre-determined spectral frequency is selected from the group consisting of 3.3 GHz, 3.9 GHz, 4.5 GHz, 4.9 GHz, 5.3 GHz, and 5.8 GHz.

* * * * *